United States Patent [19]
Lewis et al.

[11] Patent Number: 5,333,460
[45] Date of Patent: Aug. 2, 1994

[54] COMPACT AND SERVICEABLE PACKAGING OF A SELF-CONTAINED CRYOCOOLER SYSTEM

[75] Inventors: Russell G. Lewis, Manlius; Howard H. Fraser, Jr., Lafayette, both of N.Y.

[73] Assignee: Carrier Corporation, Syracuse, N.Y.

[21] Appl. No.: 993,570

[22] Filed: Dec. 21, 1992

[51] Int. Cl.$^5$ .................. F25B 9/00; F25D 19/00; F25D 19/02
[52] U.S. Cl. ............................ 62/6; 62/259.2; 62/297; 62/302; 165/104.33; 361/702; 361/725
[58] Field of Search .............. 62/6, 237, 259.2, 295, 62/296, 297, 298, 302, 448, 466; 165/104.31, 104.33; 361/381, 382, 688, 702, 725

[56] References Cited

U.S. PATENT DOCUMENTS

| | | | |
|---|---|---|---|
| 1,898,804 | 2/1933 | Ajan | 62/6 |
| 2,319,062 | 5/1943 | Holmes | 62/297 |
| 3,145,527 | 8/1964 | Morgenroth | 62/6 |
| 3,230,733 | 1/1966 | Rutishauser et al. | 62/448 |
| 3,387,648 | 6/1968 | Ward et al. | 165/104.33 |
| 3,712,078 | 1/1973 | Maynaker et al. | 62/448 |
| 3,719,051 | 3/1973 | Malaker | 62/6 |
| 3,858,802 | 1/1975 | Stobart | 62/6 |
| 4,619,316 | 10/1986 | Nakayama et al. | 165/104.33 |
| 4,793,405 | 12/1988 | Diggelmann et al. | 165/104.33 |
| 4,831,828 | 5/1989 | Klusmier et al. | 62/6 |

*Primary Examiner*—Henry A. Bennet
*Assistant Examiner*—William C. Doerrler

[57] ABSTRACT

A 250 watt cryocooler employs a Stirling cycle and is capable of maintaining a constant temperature of 77° K. while fitting a standard electronic equipment rack.

9 Claims, 3 Drawing Sheets

COMPACT AND SERVICEABLE PACKAGING OF A SELF-CONTAINED CRYOCOOLER SYSTEM

BACKGROUND OF THE INVENTION

1. Field of the Invention

This invention relates to a cooling system for an electronic apparatus having heat generating components, and more particularly to a self-contained portable cryogenic cooling system removably secured in an Electronic Industry Association (EIA) enclosure which will provide cryogenic cooling to electronic components in the EIA enclosure.

2. The Prior Art

Cryogenic cooling of CMOS (Complimentary Metal Oxide Semiconductor) chips has the potential for being the single largest market for cryocoolers. CMOS chips are used in the CPU (Central Processing Unit) of computers and are currently air cooled and operate at temperatures as high as 358° K. (185° F.). The computer manufacturers have found that by operating the CPU of a CMOS computer at cryogenic temperatures (77° K., −321° F.), the operating speed of the computer can be increased by up to a factor of two. The increase in speed effected by cryogenic cooling is comparable to that obtained by doubling the number of CPU boards in the computer. Particularly in machines with more than one board, cryogenic cooling can be a less costly way to double the speed of the computer.

Further, in the Prior Art, systems for cooling logic units by conduction with a liquid and/or at cryogenic temperature have been developed. In liquid cooling systems, logic units are completely immersed in a liquid bath. Typically, the cooling system is provided with liquid nitrogen. In a liquid cooling arrangement, components such as pumps, liquid storage vessels, and piping are located external to the enclosure which houses the logic units, otherwise major computer cabinet redesigns are necessary. In cryogenic cooling systems, which typically use liquid nitrogen and are of the "split" type, the logic units are placed in a special cryostat enclosure and the cryocooler, separated from the cryostat, is in another special enclosure, or the logic unit and cryogenic cooling system are mounted in a special cabinet with the electrical output of the logic unit connected to the computer processors in the standard EIA enclosure by way of electrical cables. The separate enclosures were needed because of the large size of the systems and to separate the noise and vibration of the cooling system from the logic unit.

SUMMARY OF THE INVENTION

It is an object of the present invention to provide a self-contained cryocooler system for cooling computer logic units which will fit into a required envelope, i.e. an EIA enclosure, which is removable from the enclosure as a complete unit and can be field serviceable for selected components, and requires only external electric power for operation. Thus, the present invention uses an "integral Stirling cryocooler" package to fit into and operate within an EIA enclosure.

A basic Stirling cryocooler comprises a compressor section and an expander/regenerator section. Reciprocating elements of both the compressor and expander are typically driven by an electric motor which drives a common crankshaft. The crankshaft uses multiple cams to properly time compressor and expander movement to obtain proper capacity and expander-compressor phase relation. Thus, the device to be cooled is mounted adjacent the expander on the cold head.

The foregoing and other features of the present invention are accomplished by providing a self-contained portable cryogenic cooling system for a computer having a vibration snubbing system to mount a cryocooler compressor to a frame member, an integrated heat rejection system having an axial fan or blower and motor and heat exchanger mounted at the rear of the package and, a pump for a closed loop fluid system attached to the frame at the front of the package with a pump motor using a magnetic drive so that the motor can be removed without exposing the fluid system, and electronic power and control boxes mounted near the fan and heat exchanger. Thus, the snubbing system minimizes noise and vibration to <6.4 bels and <0.02 g. In operating with a computer, the present cryocooler system will generate 250 watts of heat lifting capacity and maintain a constant low temperature of 77° K. (−321° F.) while having an installed weight of less than 182 Kg. (400 lbs). The size of the cryocooler system is generally 62 cm H×44.5 cm W×75 cm L (24.5 in.×17.5 in.×29.5 in.) to fit into an EIA enclosure.

DESCRIPTION OF THE PREFERRED EMBODIMENT

In accordance with the principles of the present invention a self-contained portable cryogenic cooling system is provided to cool electronic components. Copending, commonly invented design patent filed herewith and having Ser. No. 29/002,795 and entitled CRYOCOOLER, is hereby incorporated by reference for showing additional views of the overall relationship of the members.

Figure 1:
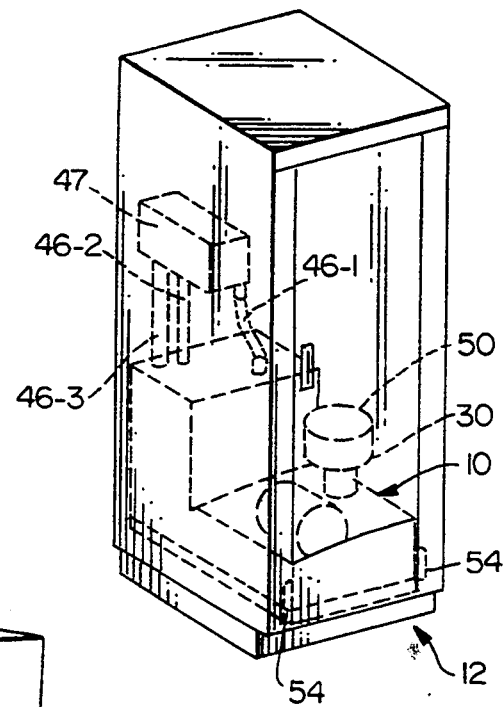
FIG. 1 is a perspective view of the exterior of a standard Electronic Industry Association enclosure for holding logic units of a digital computer and a rack utilizing the cryocooler system of the present invention.
Figure 2:
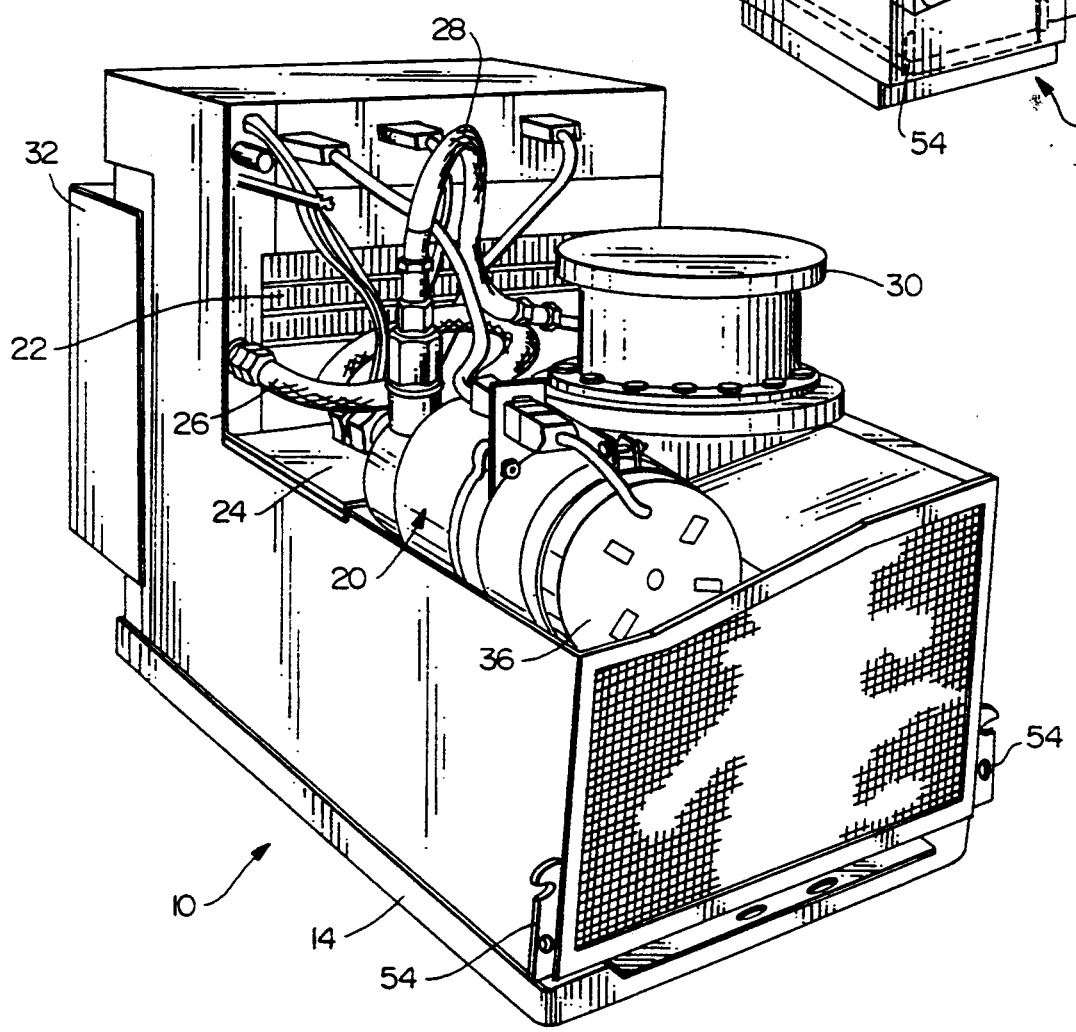
FIG. 2 is a left, front perspective view of the cryogenic cooling system of the present invention removed from the enclosure of FIG. 1.

The cryogenic cooling system 10 is removably mounted inside of an electric enclosure 12 as shown in FIG. 1, which is made to a standard specification to mount racks, which are also made to standard specifications. The self-contained portable cryogenic cooling system 10 fits into a standard 19 in. EIA rack enclosure 12. The standard racks for the enclosure 12 generally are a standard 9U×400 mm rack. The "9U" refers to the height and the "400 mm" refers to the depth of the rack. The EIA enclosure 12 generally has mounted therein racks, one on top of the other, to form a digital computer.

Referring to FIGS. 2–5, the self-contained portable cryogenic cooling system 10 comprises a generally rectangular base frame 14 for supporting a cryocooler compressor 16, an axial fan or blower and motor 18, closed loop cooling system 20 including heat exchanger 22, fluid pump 24, drive motor 36, interconnecting piping 26, 28, and rejector heat exchanger 38, and cryocooler cold head 30 all controlled by an integrated, self-controlled, diagnostic electronics package composed of a power box 48 and control box 32. Power box 48 and control box 32 include electronic control means for variable speed operation of the fan, pump and cryocooler motors as well as prognostic capabilities for maintaining proper operation/reliability and communicating means to alert the host system of non-standard operating conditions. The portable cryogenic cooling system 10 is designed to have many of its components, e.g. closed loop cooling system pump motor 36, axial fan and motor 18, electronic power and control boxes 48 and 32, and sensors field serviceable, many without removing the system from the EIA enclosure 12.

The base frame 14, generally comprising angle supports, has dampening units 34, e.g. springs, mounted thereon to support the cryocooler compressor 16 in order to reduce the transmitted vibration to the EIA enclosure 12 and the components therein to less than 0.02 g. Thus, the present system allows computers within an EIA enclosure to house an integral Stirling cryocooler, rather than having a split cryocooler in a separate enclosure.

Closed loop cooling system 20 preferably comprises an integrated heat rejection system including axial fan 18, heat exchanger coil 22, fluid pump 24, interconnecting piping 26, 28 and rejector heat exchanger 38. Preferably, the cooling system 20 has a fluid, such as brine, flowing therethrough with the fluid pump 24 having a magnetic drive motor 36 connected thereto so that the drive motor 36 can be removed without opening the closed fluid/brine system. Further, the fluid pump 24 is generally attached to the frame 14 for easy access to the drive motor 36. Generally, the interconnecting piping 26, 28 includes flexible piping with shock loops to further reduce vibration and sound levels and to increase reliability of the system. Computer manufacturers require that equipment within the computer enclosure 12 have sound power levels <6.4 bels and vibration <0.02 g. Thus, in the prior art the limited space within the enclosure 12 prevented the use of cryocoolers within such enclosures. The spring mounting system and integrated heat rejection system found to be useful in the present invention is a significant feature of the present invention.

The cryocooler 16 comprises a generally cylindrical cryocooler cold head 30 secured to a rejector heat exchanger 38, a compressor portion 40 and expander and regenerator portion 42. During operation the computer chips are cooled by the cold head 30, e.g. the chips can be in direct contact with the cold head.

The axial fan or blower and motor 18 includes a fan shroud 19 which directs air out of the EIA enclosure 12. The axial fan draws air through the front of the EIA enclosure 12 over and around the cryogenic cooler and through heat exchanger 22 to remove the heat generated by the cryocooler. Proper heat removal within a cryocooler is essential for efficient operation. Heat that is generated as a result of inefficiencies of the motor within the cryocooler 16 is conducted to and through the housing of cryocooler 16 and is picked up convectively by the airstream surrounding the cryocooler 16. Heat is also generated by the work done on the helium gas in the compression cylinder of compressor 40. This "heat of compression" must be removed from the helium before the helium enters the regenerative heat exchanger 38 in expander portion 42. This removal of heat is accomplished in the rejector heat exchanger 38 where the heat is rejected to the fluid/brine of cooling system 20 which is flowing therein as a secondary fluid. The heat picked up in rejector heat exchanger 38 by the fluid/brine is rejected through heat exchanger 22 to the air stream which is produced by blower 18 and which flows through heat exchanger 22. The discharge air of the axial fan flows from heat exchanger 22 through grill 44 to the space in which the EIA enclosure 12 is located.

Figure 5:
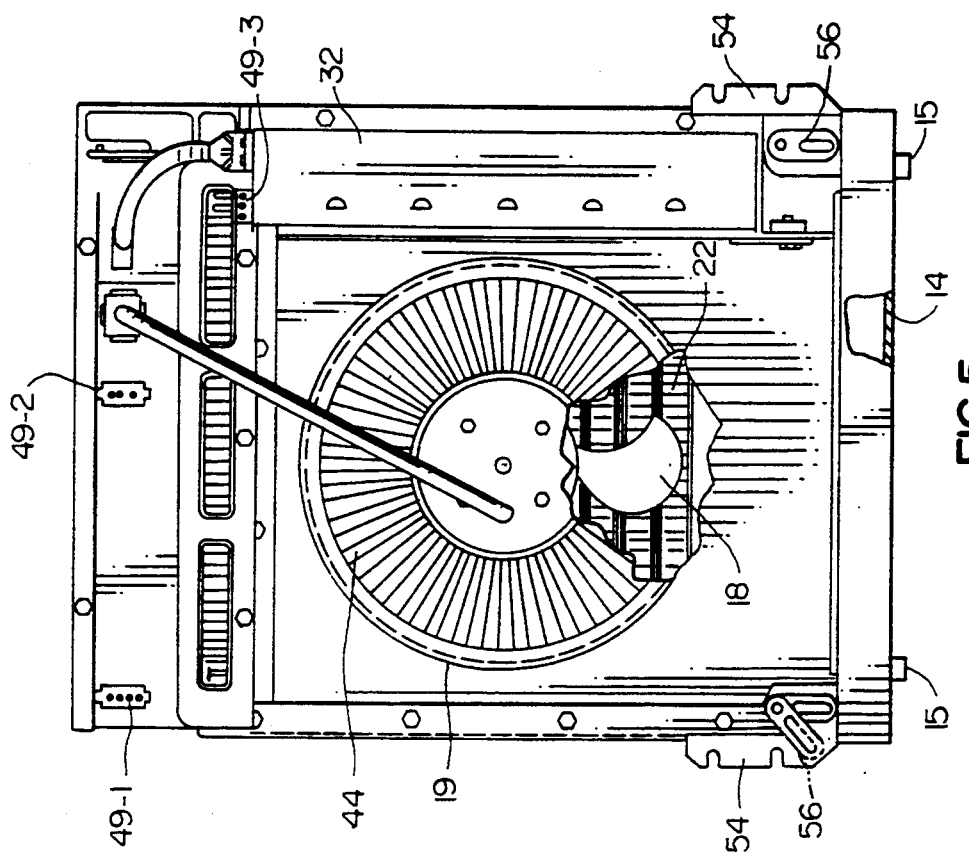
FIG. 5 is a rear elevational view of the cryogenic cooling system of the present invention, partially broken away, showing the air moving and heat exchanger systems.
Figure 3:
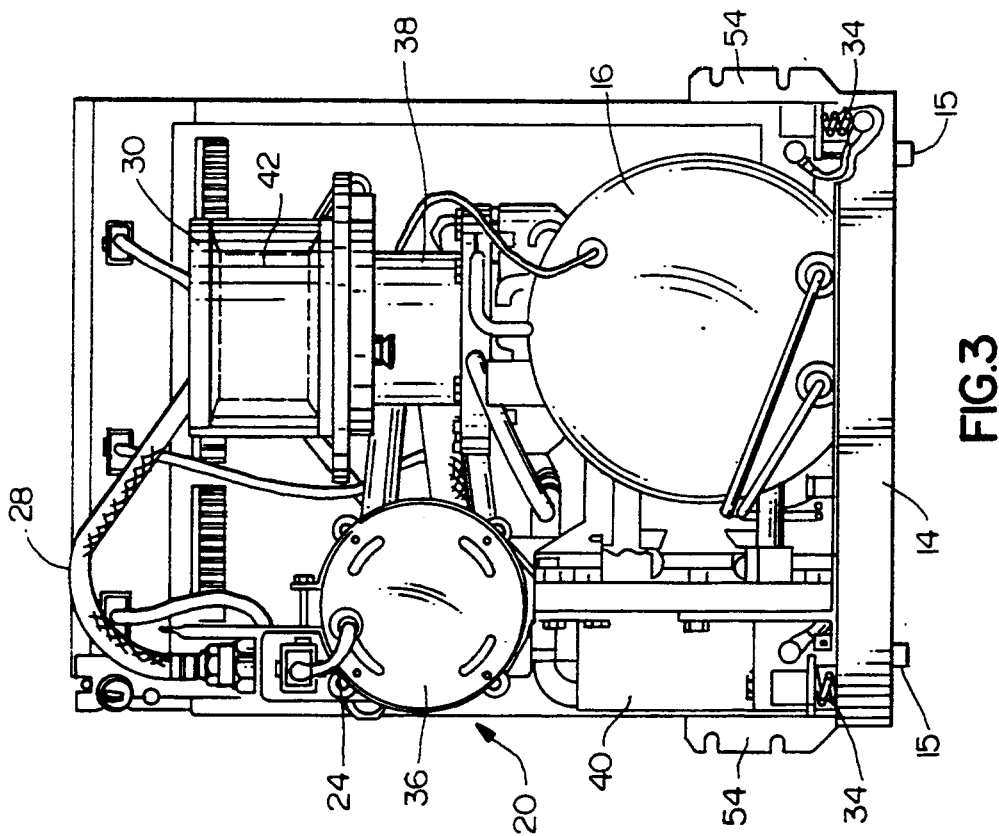
FIG. 3 is front elevational view of the cryogenic cooling system of the present invention with the cover removed to show components.
Figure 4:
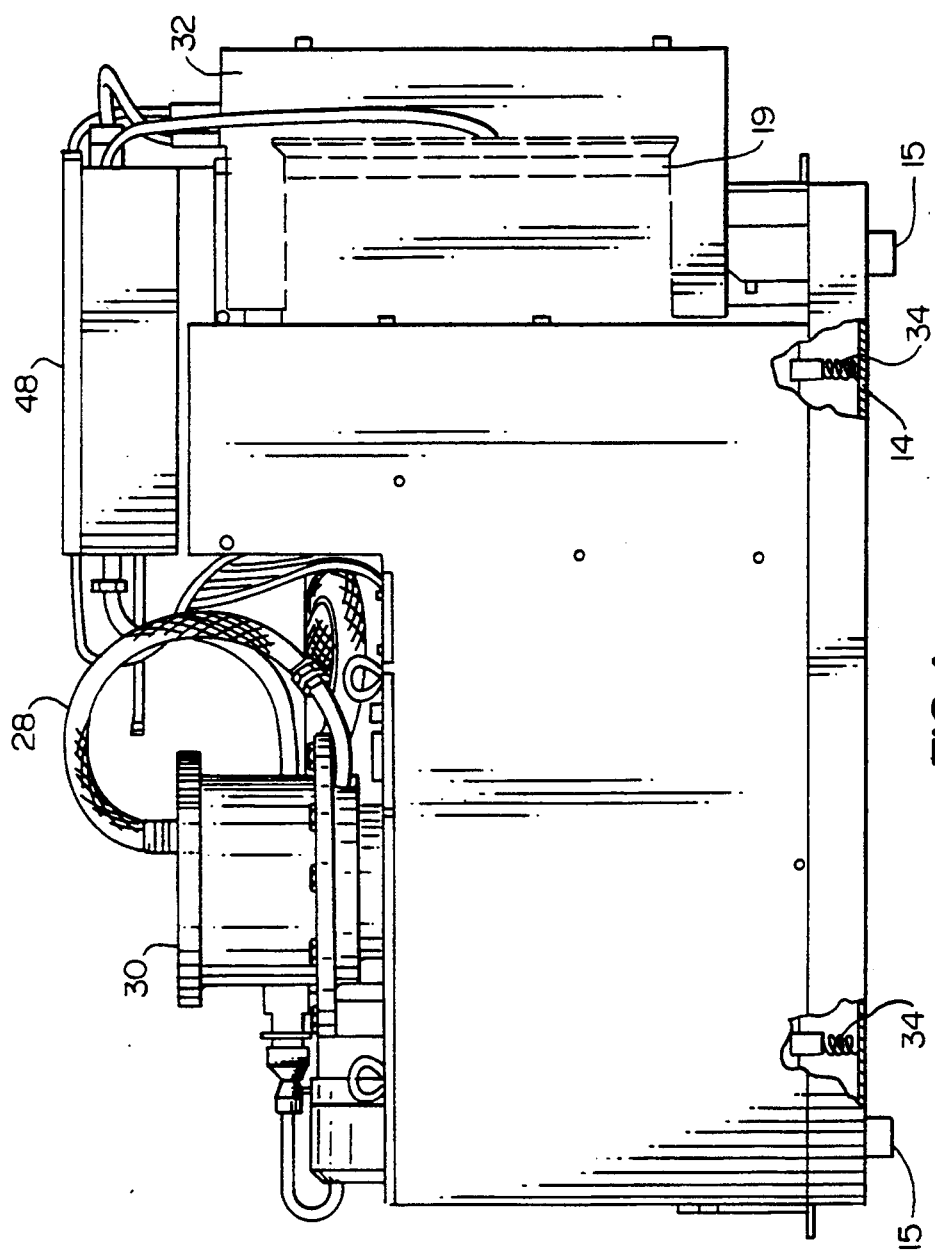
FIG. 4 is an elevational view of the right side of the cryogenic cooling system of the present invention.

If the cryogenic cooling system 10 fails while in the EIA enclosure 12, the cooling system can be easily removed, e.g. through the front door of the EIA enclosure, and quickly replaced by another cooling system. The removal of the cooling system can be accomplished quickly because the system is secured in the enclosure with a minimum number of hold-downs, preferably, two pairs of fixed hold-down devices 54 in the front and a pair of pivotable hold-down devices 56 in the rear (as shown in FIG. 5), and the system only has three power cables that have to be connected. Accordingly, to remove the cryogenic cooling system 10 from the EIA enclosure 12, the logic chips (cryostat) are detached from the cooling system, the power cables 46-1, 46-2 and 46-3 from the EIA power supply 47 are disconnected from the power jacks 49-1, 49-2 and 49-3 on the cooling system 10, and the fasteners are removed from the front hold-down devices 54 and the pivotal rear hold-down devices 56. Then the cooling system 10 can be removed from the EIA enclosure by pushing or pulling the system on low friction support means 15, preferably Teflon ® pads, secured to the base of the EIA rack for sliding engagement with bottom frame members of the system. The support means 15 permit the cooling system 10 to be easily removed from and inserted into the EIA enclosure without the need for physical lifting.

From the foregoing description it should be clear that the self-contained portable cryogenic cooling system 10 will generate a nominal 250 watts of heat lifting capacity and maintain a constant low temperature of 77° K. while fitting within a 24.5 in.×17.5 in.×29.5 in. space. Cooling system 10 is resiliently mounted on frame 14 which is adapted to be slidably received in an EIA enclosure.

The cryogenic cooling system 10 includes an integral Stirling cryocooler having a compressor section 40 and an expander/regenerator section 42 including a cold head 30 for cooling the computer chips. Heat rejection of the heat generated by the cryocooler is accomplished by an axial fan 18 drawing heated air from the mechanical components of the cryocooler through a heat exchanger 22 which is circulating fluid/brine in a closed loop.

What is claimed is:

1. A self-contained, portable cryogenic cooling system for an Electronic Industry Association (EIA) enclosure generating a nominal 250 watts of heat lifting capacity, capable of maintaining a constant low temperature of 77° K. and fitting within a 24.5 in.×17.5 in.×29.5 in. space in an EIA enclosure wherein said cooling system includes:

an integral Stirling cryocooler having a compressor section and an expander/regenerator section including a cold head; and heat rejection means for rejecting heat generated by said cryocooler including fan means for passing air over said cryocooler where said air is heated, and then through a heat exchanger and away from said cooling system.

2. The cooling system of claim 1 wherein said heat exchanger is located in a closed fluid loop which also includes a pump, a pump motor, a rejector and fluid connection means.

3. The cooling system of claim 1 further including electronic control means for variable speed operation of said fan, pump and cryocooler motors as well as prognostic capabilities for maintaining proper operation/reliability and communication means to alert a host computer system of non-standard operating conditions.

4. A cooling system for an Electronic Industry Association (EIA) enclosure for removing heat from heat generating components within the EIA enclosure comprising:

an integral Stirling cryocooler;

a generally rectangular base frame member sized to fit into the EIA enclosure for supporting said integral Stirling cryocooler thereon, whereby a cold head of said integral Stirling cryocooler is operatively connected to the heat generating components within the EIA enclosure to remove heat therefrom;

support means for flexibly connecting said integral Stirling cryocooler to said base frame member;

slide means member for movably supporting the cooling system during selective movement between an operating position inside of the EIA enclosure and a non-operating position outside the EIA enclosure; and external means connected to the cooling system when in the operating position consisting essentially of electrical power means.

5. A cooling system as set forth in claim 4 wherein said support means includes spring means wherein said spring means enables less than 0.02 g vibration to be transmitted to the heat generating components.

6. A cooling system as set forth in claim 5 wherein said slide means contacts a lower portion of the EIA enclosure.

7. A cooling system as set forth in claim 4 further including:

heat rejection means for rejecting heat generated by said cryocooler including fan means for passing air over said cryocooler where said air is heated, and then through a heat exchanger and away from said cooling system.

8. The cooling system of claim 7 wherein said heat exchanger is located in a closed fluid loop which also includes a pump, a pump motor, a rejector and fluid connection means.

9. The cooling system of claim 8 further including electronic control means for variable speed operation of said fan, pump and cryocooler motors as well as prognostic capabilities for maintaining proper operation/reliability and communication means to alert a host computer system of non-standard operating conditions.

* * * * *